July 12, 1938.  M. B. TARK  2,123,387
DUAL DIGESTION PROCESS FOR SEWAGE
Filed March 21, 1935
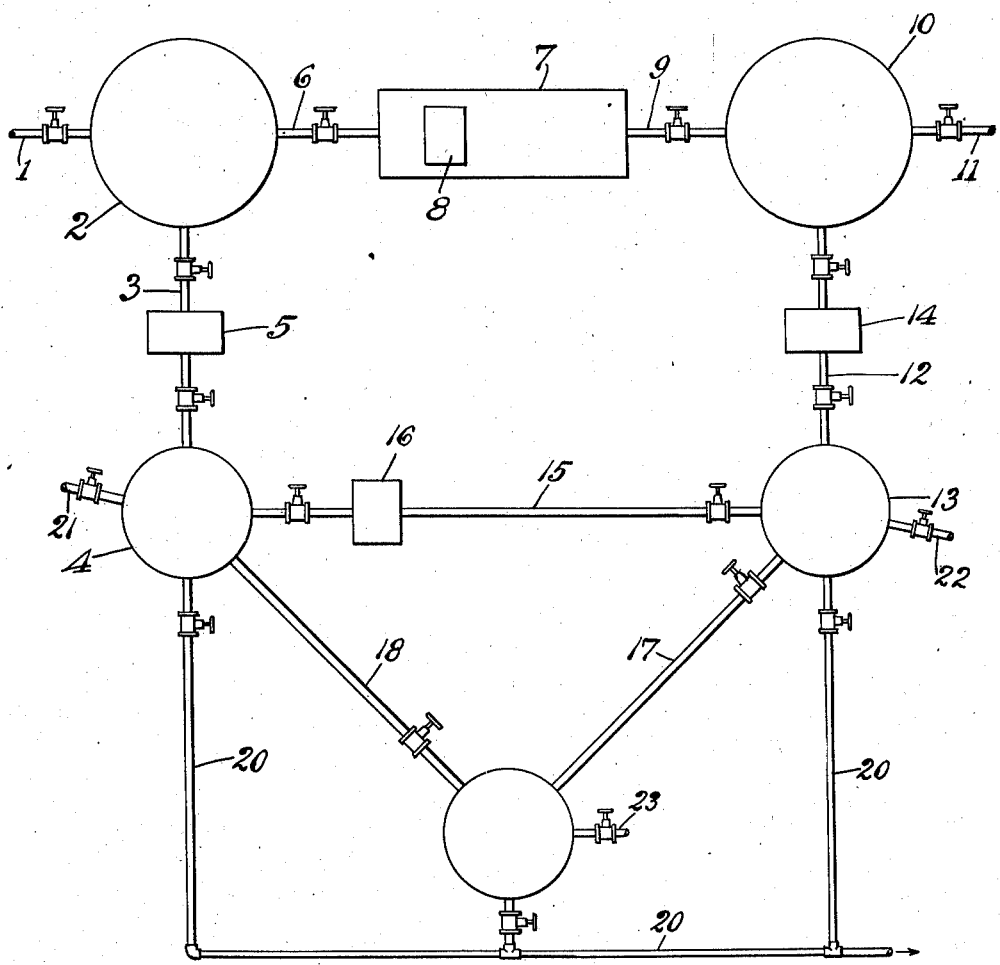
Inventor
Marcus B. Tark
by Archer & Carter
Attorneys.

Patented July 12, 1938

2,123,387

UNITED STATES PATENT OFFICE 2,123,387

DUAL DIGESTION PROCESS FOR SEWAGE

Marcus B. Tark, Philadelphia, Pa., assignor to Link-Belt Company, Chicago, Ill., a corporation of Illinois Application March 21, 1935, Serial No. 12,207

13 Claims. (Cl. 210—2)

My invention relates to improvements in apparatus for and process of treating sewage material and the like, and has for one object to improve the digestion of chemically precipitated sludge which is much more difficult to digest than is the ordinary sludge from a primary settling tank.

I propose to detain the sewage material in a primary settling tank. Settled sludge will be withdrawn in the usual manner to a primary digestion chamber where normal biological sludge digestion will take place. The effluent from the primary settling tank will pass to a mixing and flocculating tank where suitable chemical dosage will be applied to it to cause flocculation of the solids contained therein so that when the sewage material passes from the flocculation tank to a secondary settling tank, those solids which would otherwise remain in suspension will be settled out. The chemically precipitated sludge from the secondary settling tank will be discharged into a secondary chemical sludge digestion tank, while the effluent from the secondary settling tank will be decanted in the usual manner.

The sludge resulting from chemical precipitation does not digest as readily as does the sludge from the primary settling tank because of the presence of the chemicals therein, and so it is necessary to take special precaution and provide special means to control and promote the digestion of the chemical sludge. In order to accomplish this, I propose to make use of the digested sludge from the primary digestion tank.

The percentage of solids in the sludge obtained from the primary settling tank is much higher than the percentage of solids in the sludge obtained from the secondary settling tank in my process, and so there is available from the primary digestion tank a relatively large mass of sludge which I propose to use to promote digestion in the secondary tank. I propose to do this by withdrawing from the primary digestion tank and supplying to the secondary digestion tank, digested sludge which contains a maximum of live and active bacteria so as to seed the sludge in the secondary digestion tank and to maintain a proper healthy condition in the bacteria carrying on the digestive processes therein. Experience has taught that in order to promote satisfactory digestion, it is necessary to have present in the digestion chamber along with the sludge undergoing digestion, a considerable amount of completely digested sludge which gives what sewage engineers call the buffer effect. The excess of digested sludge from the primary digestion tank supplied to the secondary digestion tank furnishes this excess of digested sludge and gives this essential buffer effect.

It has heretofore been suggested that the digestion of the sludge from the primary and the secondary or chemical settling tanks can take place in a single digestion chamber, the two sludges being mixed together to undergo the digestion process. My method is an improvement over such a solution of the problem because I have found that when an attempt is made to digest together untreated sludge and chemically precipitated sludge, the chemicals in the chemically precipitated sludge which tend to make digestion of that sludge difficult also have a noticeable deleterious effect on the digestion of the untreated sludge with which they are mixed. By carrying on the digestion of the untreated sludge from the primary settling tank to completion by itself, I am enabled to obtain normal satisfactory digestion, and once that digestion has been accomplished, the digested sludge can be supplied to the secondary chemical sludge digestion tank without any deleterious effect on the product or operation of the primary tank and results in a greatly improved effect both in the operation and the product of the secondary digestion tank.

When, as is frequently the case, digestion is promoted in both tanks by heating, it may be desirable to have an additional settling tank so that sludge particles maintained in suspension in the super-natant liquor by eddy currents, convection and the like, may be settled out, and this settling tank also serves as an equalizing chamber so that when sludge is added to or withdrawn from the digestion tanks, this may be compensated for by a flow of super-natant liquor from or to the settling tank to prevent change in the level of the liquor in the digestion tanks, which might otherwise interfere with the proper digestion process.

Where I have referred to a flocculator, it will of course be understood that the dosage or chemicals supplied in the flocculator tank to the effluent from the primary settling tank might equally well be added directly in the settling tank or by any other suitable means and their effect is of course to coagulate the sewage so that the primary settling tank may be said to serve to pre-clarify the sewage.

My invention is illustrated in the accompanying drawing, wherein is shown a diagrammatic lay-out of a plant adapted to carry out my invention.

1 is the outfall sewer; 2 a primary settling tank; 3 a sludge pipe leading from the primary settling tank to the primary digestion tank 4. 5 is a sludge pump adapted to withdraw the sludge from the primary settling tank 2, and supply it to the primary digestion tank 4.

6 is an effluent pipe leading from the primary settling tank 2, to the mixing and flocculating and dosing tank 7. 8 is the chemical supplying and measuring means. 9 is a pipe leading from the flocculating tank 7 to a secondary settling tank 10; and 11 is an effluent passage adapted to discharge the effluent from the secondary settling tank 10. 12 is a sludge pipe leading from the secondary settling tank to the secondary digestion tank 13. 14 is a sludge pump associated with said pipe. 15 is a sludge pipe leading from the bottom of the primary digestion tank 4, to the secondary digestion tank 13. 16 is a pump associated with the pipe 15. 17 and 18 are super-natant liquor pipes leading respectively from the primary digestion tank 4, and the secondary digestion tank 13 to the settling tank and equalizing tank 19. Suitable valves are placed in the various pipes to control flow through them in the usual manner.

Preferably the flow to and through the primary and secondary settling tanks and the flocculation tank will be by gravity. Normally the sludge will be withdrawn from each of the two settling tanks and fed to the respective digestion tanks by the pumps, though under some circumstances, the terrain may make it possible to withdraw the sludge by gravity. The same is true with respect to the movement of sludge from the primary to the secondary digestion tanks. The flow of super-natant liquor between the two digestion tanks and the settling and equalizing tank 19 will normally be by gravity.

Sludge from the tanks 4, 13, and 19 will be discharged through the sludge discharge system 20, preferably by gravity though pumps not here shown may be provided if necessary, controlled by the valves as shown, for application to sludge drying beds or other suitable points of disposal.

In operation the flow through the primary settling tank, the flocculating tank and the secondary settling tank will normally be continuous with continuous passage of the effluent from the primary settling tank. Periodically the sludge will be withdrawn from the bottom of the two settling tanks and discharged respectively from the primary and the secondary digestion tank. Digestion in the primary digestion tank will take place in the usual manner and digested sludge will be deposited on the bottom of the tank. This digested sludge will be periodically withdrawn from the bottom of the primary digestion tank and supplied to the secondary digestion tank, care being taken that only digested sludge is so supplied. This digested sludge, carrying with it an excess supply of live, active bacteria and the like, will be added to the secondary digestion tank and there mixed with a relatively thin chemically precipitated sludge, seeding the same and furnishing the excess of digested sludge which gives the essential buffer effect.

When sludge is fed to either of the two digestion tanks, super-natant liquor will be displaced and that super-natant liquor will flow through the pipes 17 and 18 as the case may be and be trapped in the settling and equalizing tank 19. When sludge is withdrawn from either of the two digestion tanks, super-natant liquor from the tank 19 will flow into the digestion tank to maintain the level substantially constant.

When as will frequently be the case, the digestion tanks 4 and 13 are heated to promote digestion, there will be a certain amount of movement by convection of the super-natant liquor and sludge particles contained therein so that some of the sludge will not settle out to the bottom of the tank even though it has been completely digested. When it is desired to draw off super-natant liquor from either of the two digestion tanks, that liquor will pass to the settling tank 19 where it will be cooled, the digested sludge settling to the bottom of the tank whence it may be subsequently withdrawn to the sludge beds, the super-natant liquor being there clarified, may be discharged without objection.

The sludge deposited on the bottom of the primary tank 4, which is in excess of that which must be added to the secondary tank 13, may also be drawn off when desired and the same is true of the sludge deposited at the bottom of the secondary digestion tank, the sludge from all three tanks being handled and treated in the usual manner and being available to be placed on the drying beds or otherwise disposed of.

21, 22, and 23 are valved super-natant liquor pipes leading respectively from the upper portions of the digestion tanks 13 and 4 and the settling tank 19 so that means are provided in each tank to withdraw both sludge and super-natant liquor immediately from the system if that should prove desirable.

I claim:

1. Apparatus for use in the treatment of sewage which comprises a pre-clarifying tank having an inlet for raw sewage, an outlet for pre-clarified sewage and an outlet for settling sludge, a digester connected to said sludge outlet for the digestion of sludge, a settling tank connected to the said outlet for pre-clarified sewage, means for introducing a chemical coagulant into said pre-clarified sewage, an outlet connected with said settling tank for leading off the clear sewage effluent, a second digester and means for conducting sludge precipitated in the settling tank thereto for digestion and means for conducting digested sludge from the first digester to the second.

2. A continuous process of treating sewage which comprises establishing a continuous flow of raw sewage, subjecting said sewage to pre-clarification to obtain a sludge and pre-clarified sewage, withdrawing the thus pre-clarified sewage and treating it after said withdrawal with coagulants to cause precipitation of sludge from the thus treated pre-clarified sewage, drawing off the effluent, exposing the pre-clarification sludge to digestion treatment, introducing the digested sludge together with chemically precipitated sludge into a second digestion tank and exposing the chemically precipitated sludge to a process of digestion.

3. The process of treating sewage which consists in passing it through a primary settling zone, withdrawing the solids there settled out as sludge and causing their digestion in a primary digestion zone, decanting the effluent from the primary settling zone, mixing it with chemicals adapted to promote flocculation and precipitation of the remaining solids and colloids, passing the decanted liquid through a secondary settling zone, withdrawing the solids there settled out as chemically precipitated sludge and causing their digestion in a secondary digestion zone, decanting the effluent from the secondary settling zone, withdrawing digested sludge from the primary digestion zone and adding it to the sludge in the secondary digestion zone.

4. The process of treating sewage which consists in passing it through a primary settling zone, withdrawing the solids there settled out as sludge and causing their digestion in a primary digestion zone, decanting the effluent from the primary settling zone, mixing it with chemicals adapted to promote flocculation and precipitation of the remaining solids and colloids, passing the decanted liquid through a secondary settling zone, withdrawing the solids there settled out as chemically precipitated sludge and causing their digestion in a secondary digestion zone, decanting the effluent from the secondary settling zone, withdrawing digested sludge from the primary digestion zone and adding it to the sludge in the secondary digestion zone, the mass of digested sludge added to the secondary digestion zone from the primary zone being relatively large with respect to the chemically precipitated sludge.

5. The process of treating sewage which consists in passing it through a primary settling zone, withdrawing the solids there settled out as sludge and causing their digestion in a primary digestion zone, decanting the effluent from the primary settling zone, mixing it with chemicals adapted to promote flocculation and precipitation of the remaining solids and colloids, passing the decanted liquid through a secondary settling zone, withdrawing the solids there settled out as chemically precipitated sludge and causing their digestion in a secondary digestion zone, decanting the effluent from the secondary settling zone, withdrawing digested sludge from the primary digestion zone and adding it to the sludge in the secondary digestion zone, withdrawing supernatant liquor from the digestion zone to a settling zone and there settling out the sludge.

6. A sewage disposal plant comprising primary and secondary settling tanks, means for supplying sewage liquid to the primary and decanting it therefrom to the secondary settling tank, means for supplying a flocculating chemical to the decanted liquid, a primary digestion tank and means for supplying it with settled sludge from the primary settling tank, a secondary digestion tank and means for supplying it with settled sludge from the secondary settling tank, means for supplying digested sludge from the primary digestion tank to the secondary digestion tank, a settling chamber and means connecting the settling chamber with each of the digestion tanks.

7. A sewage disposal plant comprising a primary and a secondary digestion tank, a primary and a secondary settling tank, a chemical dosage tank and a settling tank for supernatant liquor, a conduit adapted to bring raw sewage to the primary settling tank, a conduit adapted to convey decanted sewage therefrom to the dosage tank and a conduit adapted to convey chemically treated sewage from the dosage tank to the secondary settling tank, separate conduits and pumps adapted to convey settled sludge from the primary settling to the primary digestion tank and from the secondary settling to the secondary digestion tank, a conduit and pump adapted to convey digested sludge from the primary to the secondary digestion tank, and means for connecting the settling tank for supernatant liquor with the primary digestion tank.

8. A sewage disposal plant comprising a primary and a secondary digestion tank, a primary and a secondary settling tank, a chemical dosage tank and a sludge settling tank, a conduit adapted to bring raw sewage to the primary settling tank, a conduit adapted to convey decanted sewage therefrom to the dosage tank and a conduit adapted to convey chemically treated sewage from the dosage tank to the secondary settling tank, separate conduits adapted to convey settled sludge from the primary settling to the primary digestion tank and from the secondary settling to the secondary digestion tank, a conduit adapted to convey digested sludge from the primary to the secondary digestion tank and conduits adapted to connect the two digestion tanks and the sludge settling tank.

9. In a sewage treatment apparatus, plural settling tanks, means for delivering sewage to both tanks, plural digesters each digester being connected to a settling tank, means for delivering settled sludge from one tank to one of the digesters and means for concurrently delivering settled sludge from another tank to another digester, and a supernatant liquor settling chamber connected with said digesters to receive the supernatant liquor from any one of said digesters.

10. In a sewage treatment apparatus, plural settling tanks, means for delivering raw sewage to one of said tanks, means for delivering chemically treated sewage to another of said tanks, means for segregating and separately digesting the sludge settling from the respective tanks said means including a plurality of digesters and connection from each of said digesters to one of said settling tanks, a common settling chamber for supernatant liquor resulting from said digestion, and means connecting said chamber with said digesters.

11. In a sewage treatment apparatus, the apparatus described in claim 10, wherein means are provided for bypassing the contents of any digester around said settling chamber to a point of discharge when desired.

12. In a sewage treatment apparatus, the apparatus described in claim 10, wherein means are provided for delivering digested sludge from one of the digesters to the other of the digesters.

13. In a sewage treatment apparatus, the apparatus described in claim 10, wherein means are provided for delivering digested sludge from one of the digesters to the other of the digesters, and for bypassing the entire contents of a digester to a point of discharge around the common settling chamber for supernatant liquor.

MARCUS B. TARK.